No. 641,140. Patented Jan. 9, 1900.
C. E. O'KEENAN.
ELECTRICITY METER.
(Application filed June 2, 1898.)
(No Model.) 3 Sheets—Sheet 1.
Fig: 1.
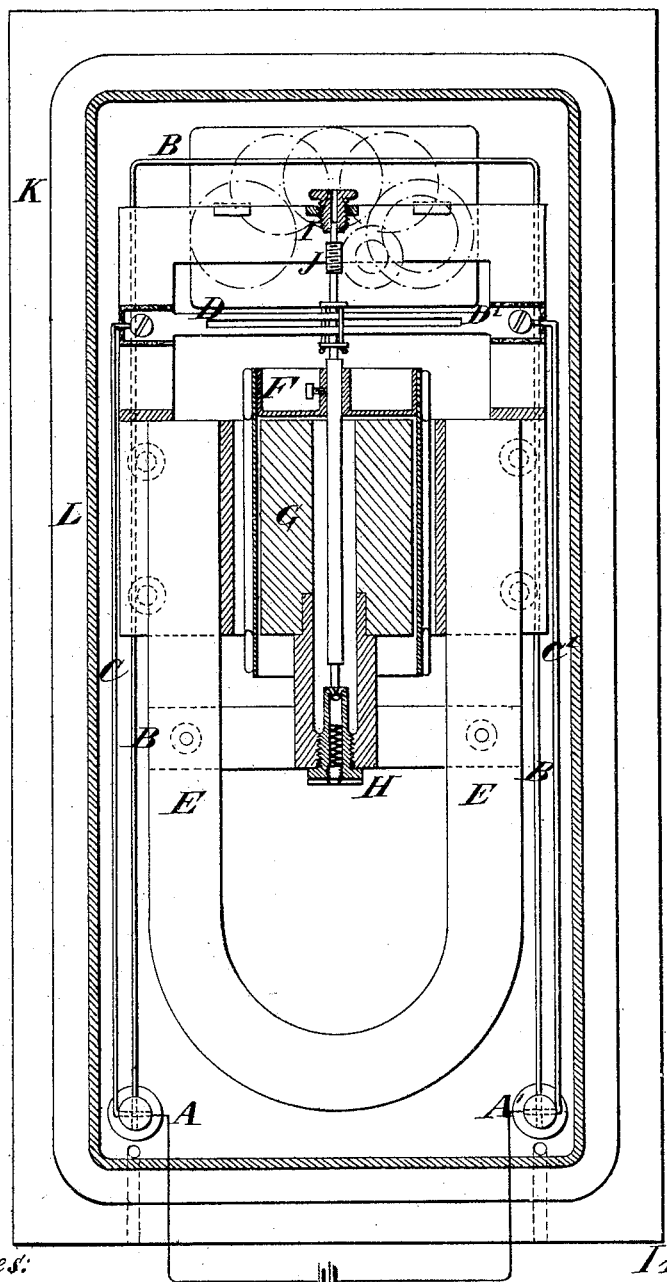
Witnesses:
Peter A. Ross
F. W. Winan
Inventor:
Charles E. O'Keenan
by Henry Connett
Attorney
THE NORRIS PETERS CO., PHOTO-LITHO., WASHINGTON, D. C.

No. 641,140. Patented Jan. 9, 1900.
C. E. O'KEENAN.
ELECTRICITY METER.
(Application filed June 2, 1898.)
(No Model.) 3 Sheets—Sheet 2.
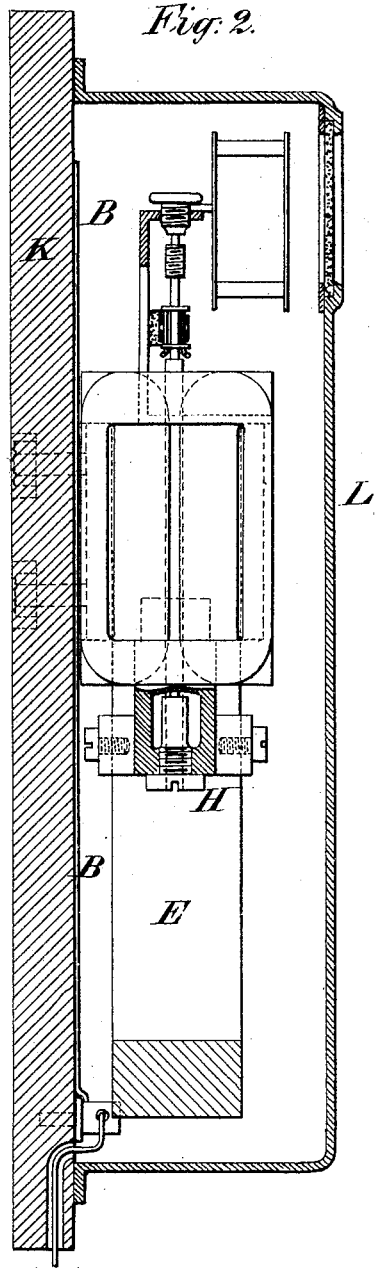
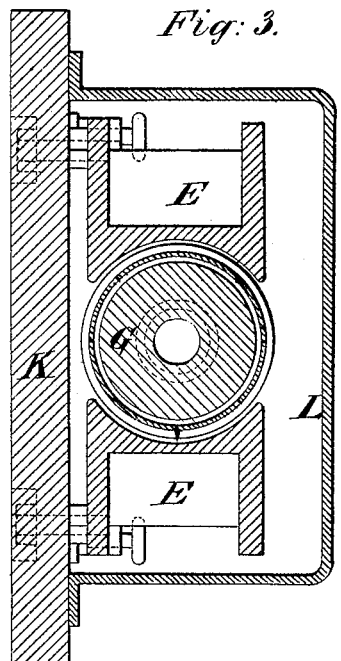
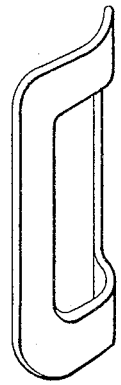
Witnesses:
Peter A. Ross
Inventor:
Charles E. O'Keenan
by Henry Connett
Attorney No. 641,140. Patented Jan. 9, 1900.
C. E. O'KEENAN.
ELECTRICITY METER.
(Application filed June 2, 1898.)

(No Model.) 3 Sheets—Sheet 3.

Witnesses
J. W. Himan
Peter A. Ross

Inventor
Charles E. O'Keenan
by Henry Connett
Attorney

THE NORRIS PETERS CO., PHOTO-LITHO., WASHINGTON, D. C.

UNITED STATES PATENT OFFICE.

CHARLES EDOUARD O'KEENAN, OF PARIS, FRANCE.

ELECTRICITY-METER.

SPECIFICATION forming part of Letters Patent No. 641,140, dated January 9, 1900.

Application filed June 2, 1898. Serial No. 682,340. (No model.)

*To all whom it may concern:*

Be it known that I, CHARLES EDOUARD O'KEENAN, a subject of the Queen of Great Britain, and a resident of Paris, France, have invented certain new and useful Improvements in Meters for Electricity, of which the following is a specification.

This invention relates to meters for measuring currents of electricity; and it has for its object to provide a rotary meter having the important property of acting under all conditions with a current through the armature which is theoretically *nil* and practically as weak or feeble as may be desired.

In the accompanying drawings several constructions embodying the invention are illustrated.

Figure 5:
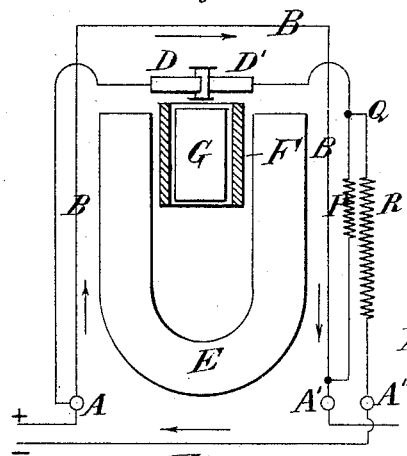
Figure 6:
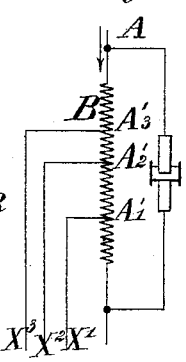
Figure 8:
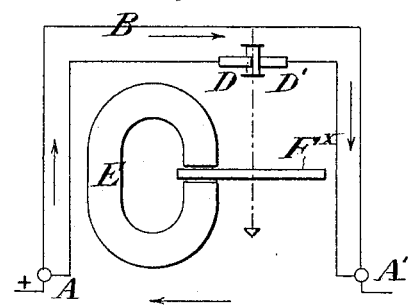
Figure 7:
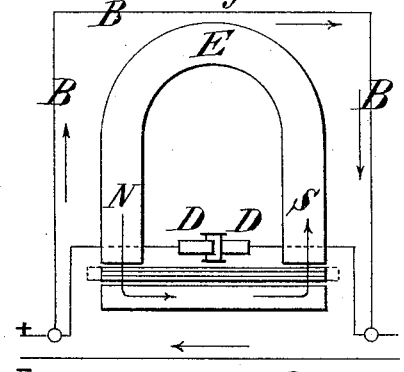
Figure 11:
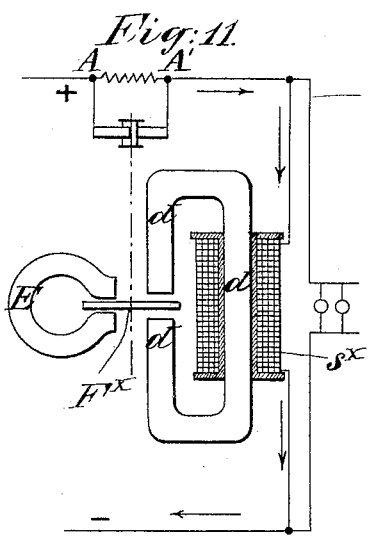
Figure 9:
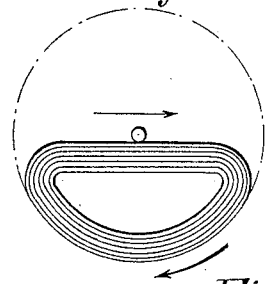
Figure 10:
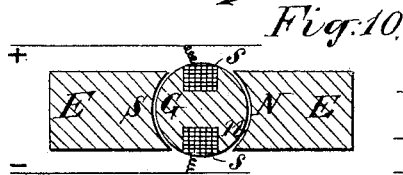
Figure 12:
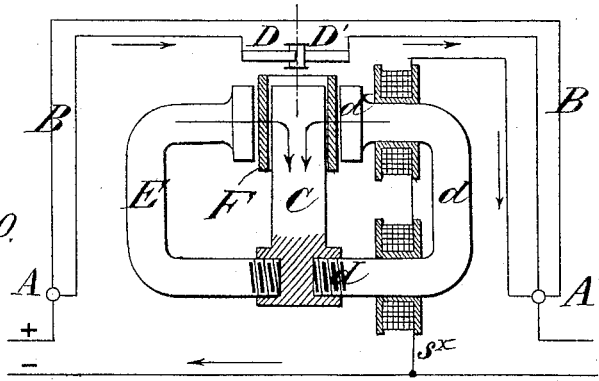

In the drawings, Figure 1 is a sectional front elevation of the meter. Fig. 2 is a sectional side elevation thereof, and Fig. 3 is a sectional plan thereof. Fig. 4 shows the elementary coil of the armature detached, the view merely showing the contour. Fig. 5 is a diagram showing the meter like that of Fig. 1, but compounded. Fig. 6 is a diagram illustrating a modified form of the fixed resistance of the meter seen in Fig. 1. Fig. 7 is a diagram of the meter having a perfect magnet with a disk armature. Fig. 8 is a diagram of another form of the meter having a disk armature. Fig. 9 is a plan of the coil applicable to the disk armatures of the meters seen in Figs. 7 and 8. Fig. 10 is a horizontal section of a form of the meter having an armature in which the central concentrator has a shuttle-winding. Figs. 11 and 12 are views showing the meter with both permanent and electro magnets for producing the magnetic field.

Referring first to Figs. 1 to 4, E is a permanent magnet of the ordinary U form provided with pole-pieces, and between its branches is situated a small armature F, of a bell shape, formed entirely of coils of copper wire covered with silk. These coils are of the form seen in the detached view, Fig. 4, which shows the contour only. The wires of these coils are connected together and with the plates of a collector or commutator according to the method of drum-winding in the Siemens continuous-current dynamos. These coils, superposed and cemented with shellac, form a very compact armature and one which while very light is not readily disarranged or distorted. In the interior of the armature F is fixed a cylinder G, of soft iron, the object of which is to diminish the magnetic resistance of the field-magnet and which I have called a "concentrator of the lines of force." The armature F is of bell form—that is to say, hollow at its lower part—in order to permit of the free entry of the metallic non-magnetic supporter of the concentrator. In the corresponding device of the Siemens drum the wires are wound on movable cores of iron, with which they form one body or mass, while in my construction they do not, and in this meter the phenomena of hysteresis are not produced during the rotation.

The arbor of the armature is supported at its lower extremity in a jeweled or hard antifriction-bearing set in a screw H and is supported at its upper end in a bearing in a screw-threaded block I, and a worm J on said arbor gears with the driving-wheel of a meter-train. (Indicated in dotted lines in Fig. 1.) The light brushes D D', Fig. 1, bear on the collector in the usual way and are connected at the binding-posts A A', respectively, with the extremities of a wire B, preferably of German silver, of sufficient size to conduct the total current measured without heating it appreciably.

W represents diagrammatically the galvanic pile or generator in the circuit between the posts A and A'.

The operation is as follows: The total current to be measured enters at the binding-post A, flows through the wire B to the post A', and thence goes out to supply the lamps of the circuit. The resistance B being invariable and its coefficient of temperature negligible, the total current will determine between the binding-posts A A' a difference of potential proportionate to the intensity of the current flowing through the wire B. The brushes D and D' have a difference of potential, and the little magneto-electric motor will be set in motion and its counter electromotive force will tend to balance the fall of potential due, according to Ohm's law, to the product of the resistance of the wire B by the current which traverses it. Its angular velocity, according to the rule, will be proportionately less, all other things being equal, the stronger the field of force is which acts upon the armature. It will be noted that the current in the armature tends to become *nil*, and, in fact, it would be completely *nil* if the passive resistance (friction) could be wholly eliminated or the flux should be indefinitely augmented. Whence it follows that the counter electromotive force, and therefore the angular velocity of the motor, will be vigorously proportional to the fall of potential between the binding-posts A and A'. In reality, by employing an intense field and armature-coils of wire of low specific resistance the proportionability may be taken as absolute. The velocity of the motor is proportional to the intensity of the current which flows through the wire B, and the clockwork, which totalizes the number of revolutions of the motor, registers thus the ampere-hours which have traversed the wire B.

The advantages of this kind of meter over those which employ Foucault-current brakes or brakes having fan-wheels rotating in a liquid will be apparent, as in these last named the watts absorbed in keeping up the rotation of the armature increases enormously with the current measured or are always very considerable. Finally, meters having brakes are electric motors giving bad efficiency by producing important work which is dissipated by the brakes. This meter, on the contrary, is an electric motor which yields good efficiency, turning free and clear, in which every precaution has been carefully taken to annul all the effects from Foucault currents, hysteresis, Joule effects, and friction. One will readily comprehend the advantage of such a motor in considering the causes of stoppage and bad action of ordinary meters, which are often troubled with sparking at the brushes, due to bad contact. Now in my meter the number of watts absorbed for rotating the armature at the maximum being about .0002 watt, while in that of some ordinary meters of about the same torque the circuit in the armature absorbs constantly five watts or twenty-five thousand times more it is clear that my motor possesses an important advantage over these on this point. Another advantage of my meter is that the surrounding or ambient temperature has no sensible influence either on the German-silver or nickeline wire B or on the flux of the field-magnet, as the meter is practically insensible to variations of temperature by reason of the fact that its contour electromotive force, and consequently its angular velocity, depends only on the difference of potential at the binding-posts A and A', of the magnetic flux, and of the constant of the construction of the armature, and not at all on the resistance in the coils. In brake-meters the resistance of the brake varies with the ambient temperature, because the resistance of the copper brakes or the viscosity of the liquids in which the fan-wheels rotate varies with the temperature or the resistance to the fan-blades which move in the air is modified by atmospheric pressure, &c.

I have said that the armature-windings of my motor should have little specific resistance and that the difference of temperature does not influence the exactness of the meter's record. There is no contradiction in this; but a wire of better conductivity may give more sensibility for setting the motor in motion, a feebler armature-current, and a more perfect proportionality throughout the system. The current flowing through the armature of my meter is quasi-infinitesimal and nearly constant.

Although the friction in my meter may be very slight, so that it may ordinarily be taken as uniform, and thus allowed for, there may be cases where it is desirable to balance very carefully the slight perturbations due to friction. Such a case is where a meter adapted for measuring very strong currents is employed for measuring feeble or weak currents. To meet this requirement, the construction seen in Fig. 5 may be employed. A meter similar to that seen in Fig. 1 is so constructed that the brush D' in place of being connected directly with the binding-post A' is connected through a feeble resistance P to the binding-post A'. A second and strong resistance-coil R—say forty thousand times that of the armature for a current of one hundred and ten volts—is placed in a branch from the wire at Q between the brush D' and coil P, and from the other end of this coil R a wire extends to another binding-post A'' of the station. The constantly very feeble current which passes from one pole to the other, following the circuit from A' through the coil P to Q, and thence through the coil R to A'', determines a fall of potential quasi-infinitesimal at the binding-posts of the resistance P, which fall is calculated for exercising on the armature a constant element equal to and of contrary signs to those of the element of friction which is also constant. (Coulomb's law.) The meter thus compounded is made extremely sensitive and will be set in motion by the least current traversing the wire B.

The apparatus, as seen in Fig. 1, may serve as a volt-hour meter for circuits where all of the consuming devices are in tension. The wire B has then usually a greater resistance than that before described and may be put in tension with an additional German-silver resistance suitably arranged. The circuit thus formed is placed simply in derivation at the points between which we wish to measure the volt-hours. The resistance of the wire B may have any suitable value and this may be infinite. If we maintain between the binding-posts A and A' a constant difference of potential, (even by means of a pile with a constant voltage,) we have still a volt-hour meter or an hour-meter, if the dial is graduated to hours, minutes, &c.

The form of motor illustrated in Fig. 1 is not the only one that can be employed and other forms will give equally good results, provided that, as in the case of the motor of Fig. 1, the motor-armature is hollow and magneto-electric, and therefore that one has set no brake and has taken care to avoid, as far as possible, loss through inside work, through hysteresis, through Foucault currents in the armature and neighboring parts due to unsymmetrical winding of the armature, or through mechanical friction of the moving parts. These losses will be avoided if the apparatus contains neither movable iron nor movable conductors in which Foucault currents may be produced, nor fixed adjacent conductors in which parasitic currents may be produced, and if the mechanical friction is reduced so much that its brake effect is practically *nil*.

Some other forms of magnetic motors will now be described, which act on the same principle and permit of obtaining the same results as that already described.

Fig. 6 illustrates a modified form of the resistance B of Fig. 1, which permits of producing an ampere-hour meter having a variable rate registration. The derived circuits $A'^1 X^1 A'^2 X^2 A'^3 X^3$ determine in the resistance B differences of potential which will be proportional to the respective products of the proportional resistances $A A'^1 A A'^2 A A'^3$ by the currents which traverse them. (Ohm's law.) By varying these resistances we vary the rate of the potential due to each derived circuit, and therefore the velocity of the motor which totalizes these potentials on the register.

Figs. 7 and 8 represent meters with disk armatures $F^X$, of which the theory is the same as that of the motor of Fig. 1.

The meter described in Fig. 1 may serve, as before stated, as an ampere-hour meter or as a volt-hour meter, and it may also be utilized as a watt-hour meter if the concentrator G be shuttle-wound, Fig. 10, with fine wire $s$, the extremities of which connect with the main leads. In this case the derived current traversing the coil $s$ will be proportional to the voltage of the station. If the direction of this derived current is such that the flux of the permanent magnet E is reduced one-half, (at the mean voltage,) the apparatus will be a watt-hour meter, for if the voltage rises one per cent. the current traversing the wire $s$ on G will increase one per cent., the demagnetization will augment one per cent., and the resulting flux (from the point of view of counter electromotive force) will diminish one per cent. Now the angular velocity of the system, all things otherwise equal, is inversely proportional to the flux. If, then, the resulting flux shall diminish one per cent., the angular velocity will increase one per cent. and the totalization on the register-dial will increase one per cent. We may reach the same result by the construction shown in Fig. 11, which has a disk armature $F^X$ rotating in the field of force of a preponderating permanent magnet E and also in the field of force of an electromagnet $d$, of which the fine-wire coil $s^X$, a branch derived from the system, is calculated in such a manner relatively to the mean voltage of the system that the flux of the electromagnet may be one-half that of the magnet. During the rotation the electromagnet, of which the flux is about one-half that of the permanent magnet, will induce an electromotive force about one-half and of a sign contrary to the counter electromotive force due to the permanent magnet, so that the resultant flux (from the point of view of counter electromotive force) of the permanent magnet and the electromagnet will decrease one per cent. if the exciting-current of the electromagnet increases one per cent., and it follows that the angular velocity of the motor will increase one per cent.

Fig. 12 represents another construction of the same apparatus with a bell-armature. The magnetic circuits of the magnet E and electromagnet $d$ are closed by a piece C of soft iron, in which are screwed the permanent magnet and electromagnet. The above explanation of Fig. 11 applies as well to this figure.

In these last-described forms of watt-hour meters it will be seen that it will suffice to break the connections of the exciting-coil $s$ or $s^X$, and the apparatus will become without change an ampere-hour meter, as first described.

Having thus described my invention, I claim—

1. In an electric motor-meter, the combination with a strong permanent magnet, of a movable armature consisting of a plurality of coils of wire of good conductivity, revolubly mounted in the field of the magnet; this armature giving no motion to, nor containing in its structure any movable parts which can produce a damping effect upon said armature, such as hysteresitic, Foucault, or parasitic losses induced therein, or in adjacent conducting parts, or even mechanical friction, the latter being in fact so minimized by construction that all retarding effect is practically avoided, substantially as set forth.

2. In an electric motor-meter, the combination with a strong permanent magnet, of a movable armature consisting of a plurality of coils revolubly mounted in the field of the magnet, this armature giving no motion to, nor containing any parts that can produce a damping effect upon said armature; and a registering device actuated by said armature, substantially as described.

3. In an electric motor-meter, the combination with a strong permanent magnet, of a movable armature consisting of a plurality of coils revolubly mounted in the field of the magnet, this armature giving no motion to, nor containing any parts that can produce a damping effect upon said armature, and a commutator connected to said coils, conducting-wires, and very light brushes, for connecting the commutator to an electrical resistance made of a single German-silver wire, which wire being traversed by almost the entire current to be measured will determine according to Ohm's law a fall of potential proportional to the current which will traverse it, substantially as set forth.

4. In an electric motor-meter, the combination with a strong permanent magnet, of a movable armature consisting of a plurality of coils revolubly mounted in the field of the magnet, this armature giving no motion, nor containing any parts that can produce a damping effect upon said armature, and a commutator connected to said coils, conducting-wires and very light brushes, for connecting the source of potential to said commutator, and said source of potential, which is made of a pile or galvanic cell of constant voltage, substantially as set forth.

5. In an electric motor-meter, the combination with a strong permanent magnet, of a movable armature consisting of a plurality of coils revolubly mounted in the field of the magnet, this armature giving no motion to, nor containing any parts which can produce a damping effect upon said armature, and having its coils in a derived branch of a low resistance B, through which flows almost the entire current to be measured, and a resistance P, connected respectively with one brush of said armature and with one end of the resistance B, which resistance P, being traversed by an additional constant current, determines a small and constant additional fall of potential, which, reacting on armature produces therein a constant torque sufficient to balance exactly the small resisting torque of friction and thus render the proportionality of the meter still more perfect and accurate, substantially as set forth.

6. In an electric motor-meter, the combination with a strong permanent magnet, of a movable armature consisting of a plurality of coils revolubly mounted in the field of the magnet this armature giving no motion to, nor containing any parts that can produce a damping effect upon said armature, this armature consequently being without movable iron, without movable conducting parts, or parts in which parasite currents may form, and having antifriction-bearings, and a commutator connected to said coils, conducting-wires, and very light brushes for connecting the commutator to an electrical resistance B made of a single German-silver wire, this resistance being divided in sections of which the length is determined in such a manner as to permit of registering different rates, these rates being proportional to the resistance from the initial binding-post to the points of derivation, substantially as set forth.

7. In an electric motor-meter, the combination with a strong permanent magnet, of a movable armature giving no motion to, nor containing any parts that can produce a damping effect upon said armature, such armature having its coils in a derived branch circuit between the binding-posts of a fixed resistance B, and being practically without friction, and a special coil $s$, of fine wire connected in derivation to the main electric poles of the installation, through which coil flows a small derived current proportional to the voltage of the station, which coil reacts magnetically on the armature and diminishes therein the counter electromotive force, whereby the angular velocity of armature is made proportional to the electrical power to be measured, substantially as set forth.

In testimony whereof I have signed this specification in the presence of two subscribing witnesses.

CHARLES EDOUARD O'KEENAN.

Witnesses:
EDWARD P. MACLEAN,
ALEXANDRE MATHIEU.